US009953414B2

United States Patent
Noda

(10) Patent No.: US 9,953,414 B2
(45) Date of Patent: Apr. 24, 2018

(54) IMAGE PROCESSING APPARATUS AND IMAGE PROCESSING METHOD

(71) Applicant: CANON KABUSHIKI KAISHA, Tokyo (JP)

(72) Inventor: Takeshi Noda, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/077,328

(22) Filed: Nov. 12, 2013

(65) Prior Publication Data
US 2014/0153803 A1 Jun. 5, 2014

(30) Foreign Application Priority Data

Nov. 30, 2012 (JP) ................................. 2012-263674
Oct. 17, 2013 (JP) ................................. 2013-216757

(51) Int. Cl.
G06K 9/00 (2006.01)
G06T 7/00 (2017.01)
G06T 11/00 (2006.01)

(52) U.S. Cl.
CPC .......... G06T 7/0012 (2013.01); G06T 11/006 (2013.01); G06T 2211/424 (2013.01)

(58) Field of Classification Search
CPC ........... G01N 2223/419; G01N 23/046; G01V 5/0025; G06T 11/006; G06T 2211/424; G06T 7/0012
See application file for complete search history.

(56) References Cited

U.S. PATENT DOCUMENTS

| 6,493,416 | B1 * | 12/2002 | Hsieh ................................. 378/4 |
| 8,005,286 | B2 * | 8/2011 | Grasruck et al. ............. 382/131 |
| 8,355,594 | B2 | 1/2013 | Noda ............................ 382/260 |
| 8,655,034 | B2 | 2/2014 | Noda ............................ 382/128 |
| 8,755,585 | B2 * | 6/2014 | Nakanishi .............. A61B 6/032 382/131 |
| 2003/0007601 | A1 * | 1/2003 | Jaffray ................... A61B 6/032 378/65 |
| 2007/0268996 | A1 * | 11/2007 | Hagiwara et al. ................ 378/4 |
| 2011/0019933 | A1 | 1/2011 | Noda ............................ 382/260 |

(Continued)

FOREIGN PATENT DOCUMENTS

JP 2002-133399 5/2002
WO WO 2012/131520 10/2012

OTHER PUBLICATIONS

Thibault et al. ("A three-dimensional statistical approach to improved image quality for multislice Helical CT", Med. Phys. vol. 34, issue 11, Oct. 29, 2007).*

(Continued)

Primary Examiner — Amara Abdi
(74) Attorney, Agent, or Firm — Fitzpatrick Cella Harper and Scinto

(57) ABSTRACT

An image processing apparatus for reconstructing a tomographic image from a plurality of projection images acquires noise data for a plurality of projection images, respectively, acquires noise reconstruction data by executing reconstruction processing based on the acquired noise data, and reconstructs the tomographic image by executing the reconstruction processing based on the projection images and the noise reconstruction data.

15 Claims, 9 Drawing Sheets

(56) References Cited

U.S. PATENT DOCUMENTS

| | | | |
|---|---|---|---|
| 2011/0044524 A1* | 2/2011 | Wang | G01R 33/54 382/131 |
| 2011/0135182 A1* | 6/2011 | Goto et al. | 382/131 |
| 2011/0150305 A1* | 6/2011 | Zeng | G06T 11/005 382/131 |
| 2011/0158550 A1 | 6/2011 | Noda | 382/128 |
| 2011/0280459 A1* | 11/2011 | Nakanishi | A61B 6/032 382/131 |
| 2011/0286651 A1* | 11/2011 | Yu et al. | 382/131 |
| 2011/0293159 A1* | 12/2011 | Bruder | A61B 6/032 382/131 |
| 2011/0293160 A1* | 12/2011 | Bruder | A61B 6/032 382/131 |
| 2012/0020448 A1* | 1/2012 | Khare | G06T 11/006 378/4 |
| 2012/0128225 A1 | 5/2012 | Noda | 382/131 |
| 2012/0263360 A1 | 10/2012 | Zhu et al. | 382/131 |
| 2013/0089252 A1* | 4/2013 | Shechter | 382/131 |
| 2013/0101190 A1 | 4/2013 | Shi et al. | 382/131 |
| 2013/0156282 A1 | 6/2013 | Noda | 382/131 |
| 2013/0336562 A1* | 12/2013 | Zamyatin | G06T 11/006 382/131 |
| 2013/0343623 A1 | 12/2013 | Fan et al. | 382/131 |
| 2014/0307261 A1* | 10/2014 | Popescu | G01N 21/45 356/450 |
| 2014/0314331 A1* | 10/2014 | Zabic | G06T 5/002 382/254 |

OTHER PUBLICATIONS

Thibault et al. "A three-dimensional statistical approach to improved image quality for multislice Helical CT", Med. Phys. vol. 34, issue 11 (Oct. 29, 2007).*

Galatsanos et al (methods for choosing the regularization parameter and estimating the noise variance in image restoration and their relation, IEEE transaction on image Processing, vol. 1, No. 3, Jul. 1992).*

J.B. Thibault et al., "A Three-Dimensional Statistical Approach to Improved Image Quality for Multislice Helical CT", *Med. Phys.* vol. 34, issue 11 (Oct. 29, 2007).

Office Action issued May 23, 2014 in counterpart British patent application 1320721.2.

JPO Office Action dated Jul. 14, 2017, in counterpart Japanese patent application 2013216757 (with English summary of relevance—see above).

\* cited by examiner

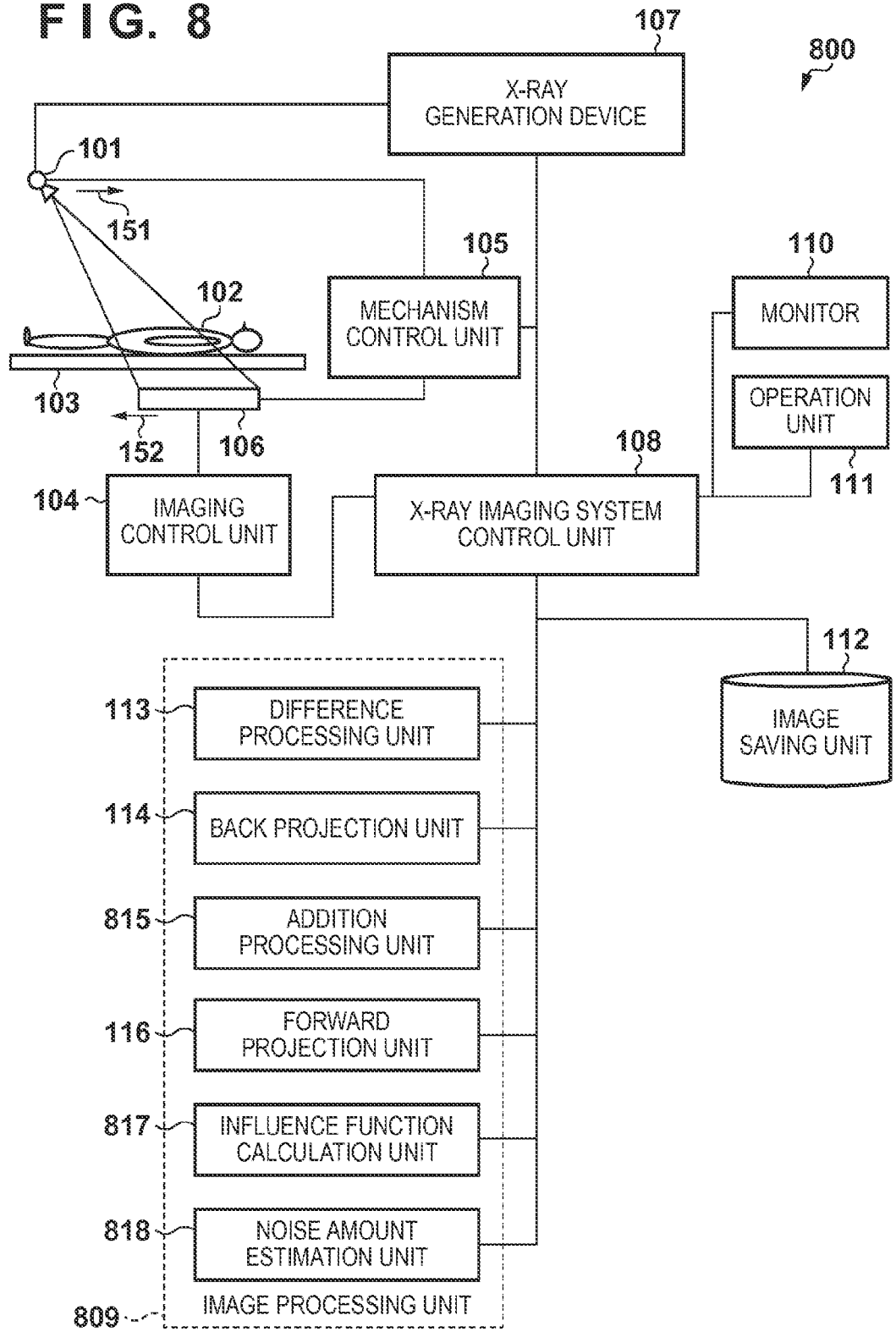

IMAGE PROCESSING APPARATUS AND IMAGE PROCESSING METHOD

BACKGROUND OF THE INVENTION

Field of the Invention

The present invention relates to an image processing apparatus and an image processing method in a tomographic image diagnosis using X-rays.

Description of the Related Art

Although it has been more than 40 years since a diagnosis apparatus based on a tomographic image using X-rays was commercialized in the 1970s, the diagnosis apparatus is still developing and stays in action, taking a leading role in a diagnosis technique. Recently, due to the speeding up of processing and the increase in memory amount brought about by the advancement of computer hardware, products using iterative reconstruction (sequential approximation reconstruction), which have been traditionally considered difficult to commercialize, have become commercially available.

Unlike filtered back projection, iterative reconstruction is a method that uses algebraic reconstruction. In this method, the tomographic image is obtained sequentially by repeating forward projection and back projection so that a projection image of the tomographic image matches a projection image which is actually imaged.

Iterative reconstruction spends much more time on reconstruction than filtered back projection. However, because it is possible to incorporate various mathematical models into reconstruction, scattered ray correction, artifact correction, detector resolution correction, noise reduction, and the like can be considered. This enables generation of a tomographic image with a higher signal-to-noise (S/N) ratio than was previously possible and suppression of artifacts.

Regulation is one of the most important elements in mathematical models. Regulation is a means for providing a priori information of a tomographic image as a constraint condition in reconstruction. For example, Thikonov-Philips regulation, which provides continuity of pixel values of a tomographic image as a constraint condition, is famous. In addition, L1 norm regulation used in the field of inverse problems such as Compressed Sensing has been applied to reconstruction in recent years.

A reconstruction method of changing the degree of regulation depending on a pixel value difference (contrast) of the tomographic image is described in U.S. Pat. No. 8,005,286 ("literature 1", hereinafter) and "A three-dimensional statistical approach to improved image quality for multislice helical CT", Thibault, J. B. et al., *Med. Phys., vol.* 34, issue 11 (2007) ("literature 2", hereinafter). These approaches weaken the degree of regulation in an area of a large pixel value difference, and strengthen the degree of regulation in an area of a small pixel value difference.

Generally, the noise amount differs depending on the pixel value in an X-ray image. Furthermore, in the tomographic image, the noise amount is never the same even when the pixel value (CT value) is the same. This is because the tomographic image is reconstructed from a plurality of projection images, and the noise amount cannot be decided.

SUMMARY OF THE INVENTION

Under the circumstance, according to an embodiment of the present invention, there are provided an image processing apparatus and an image processing method, which enable noise reduction for each projection image when reconstructing a tomographic image from the projection image.

According to one aspect of the present invention, there is provided an image processing apparatus for reconstructing a tomographic image from a plurality of projection images, comprising: an acquisition unit configured to acquire noise data for the plurality of projection images, respectively; a reconstruction processing unit; and a control unit configured to execute first control for obtaining noise reconstruction data based on the noise data acquired by the acquisition unit, and second control for reconstructing the tomographic image based on the projection images and the noise reconstruction data by the reconstruction processing unit.

Also, according to another aspect of the present invention, there is provided an image processing method of reconstructing a tomographic image from a plurality of projection images, the method comprising: acquiring noise data for the plurality of projection images, respectively; acquiring noise reconstruction data by executing reconstruction processing based on the acquired noise data; and reconstructing the tomographic image by executing the reconstruction processing based on the projection images and the noise reconstruction data.

Further features of the disclosure will become apparent from the following description of exemplary embodiments with reference to the attached drawings.

BRIEF DESCRIPTION OF THE DRAWINGS

FIG. 8 is a block diagram showing an example of the functional arrangement of an X-ray imaging apparatus according to a third embodiment;

DESCRIPTION OF THE EMBODIMENTS

An image processing apparatus, an image processing method, and a program according to embodiments of the present invention will be described in detail below with reference to the accompanying drawings. Note that tomosynthesis will be described as an example in the following description. Here, tomosynthesis or digital tomosynthesis is a technique of irradiating an object with X-rays at different angles while moving an X-ray tube, and reconstructing a tomographic image of a slice having an arbitrary height from a series of projection image acquired. An example of an X-ray sensor moving along an object is shown in tomosynthesis according to an embodiment described below, but the X-ray sensor may be fixed. Note that the embodiment of the present invention also includes a normal X-ray CT, as well as reconstruction in MRI, SPECT, PET or the like.

Figure 1:
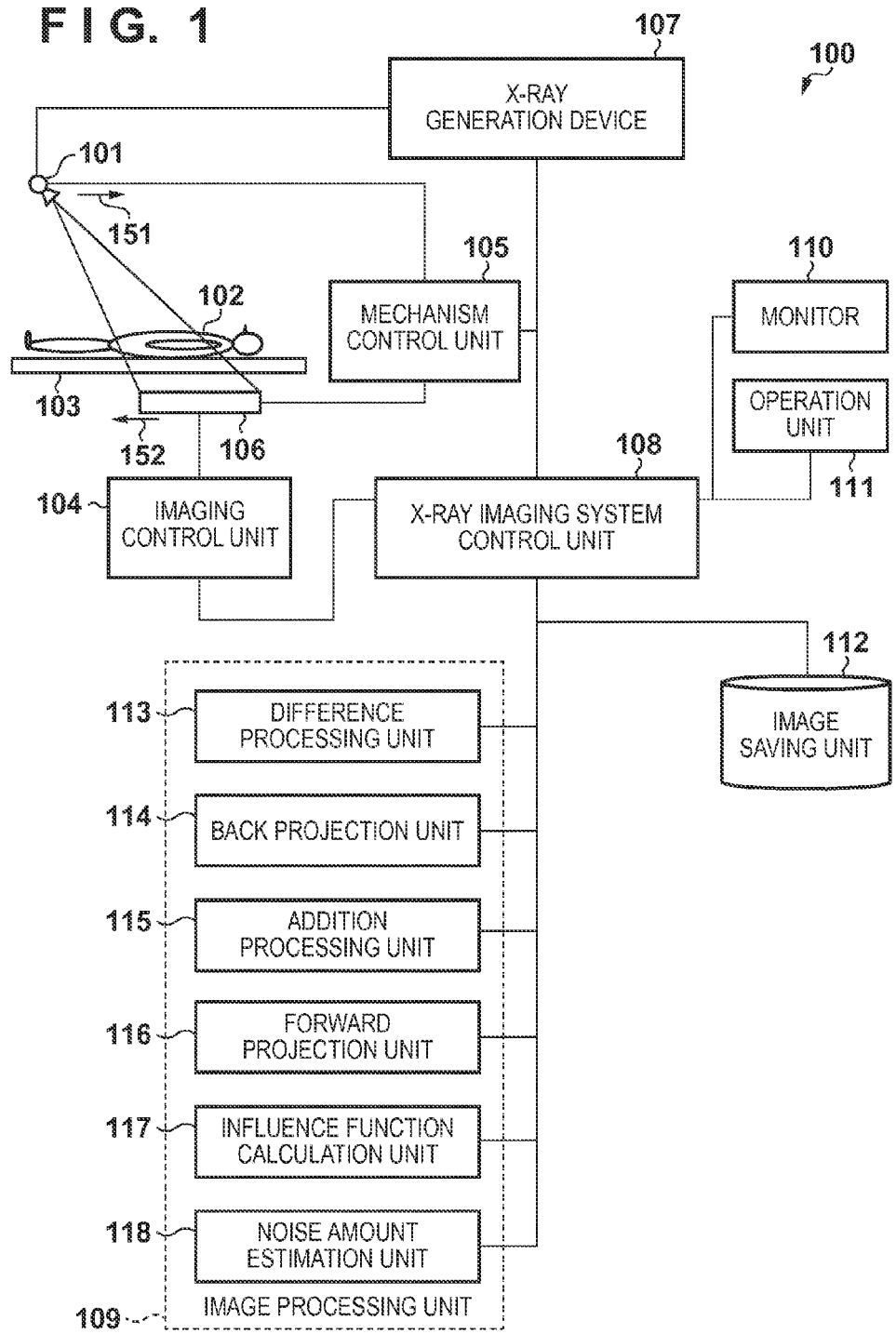
FIG. 1 is a block diagram showing an example of the functional arrangement of an X-ray imaging apparatus including an image processing apparatus according to an embodiment.

FIG. 1 shows an example of the functional arrangement of an X-ray imaging apparatus 100 according to an embodiment. The X-ray imaging apparatus 100 is one imaging modality, which includes an X-ray tube 101, an X-ray detector 106, a mechanism control unit 105, an X-ray imaging system control unit 108, an image processing unit 109, a monitor 110, and an operation unit 111. In one form, these units are physically separate units. In this sense, the image processing unit 109 is sometimes referred to, for example, as an image processing apparatus. Alternatively, a combination of the X-ray imaging system control unit 108 and the image processing unit 109 may be regarded as an image processing apparatus because the X-ray imaging system control unit 108 integrally controls the image processing unit 109. Also, a combination of an imaging control unit 104 and the image processing unit 109 may be regarded as an image processing apparatus.

The X-ray tube 101 includes a target which generates X-rays upon collision of electrons, and a collimator which shapes the generated X-ray beam. The X-ray tube 101 is fixed to a moving mechanism (not shown). A generation unit moving mechanism includes a motor, which changes the position and the orientation of the X-ray tube 101. This allows the X-ray tube 101 to irradiate an object with X-rays from a plurality of irradiation angles.

A bed 103 includes a top for an object 102 to lie down and leg portions which are fixed to the top and keep the top at a predetermined height from the floor. The top according to the embodiment is placed parallel to the floor surface by the leg portions in order to image the object 102 in a lying position. Note that the bed or the top is unnecessary when imaging the object in a standing position in other cases.

The X-ray detector 106 includes an X-ray sensor which has sensitivity to X-rays in a region of, for example, 14×17 inches, a driving circuit which controls the X-ray sensor to set a charge accumulation state or a readout state, an amplifier which amplifies an analog output from the X-ray sensor, an A/D converter which performs conversion into a digital value, a communication circuit, and a controller which is implemented by at least one CPU or FPGA integrally controlling them. An X-ray image designates digital data of one frame or a group of frames of the X-ray sensor obtained by the A/D converter. Alternatively, the X-ray image designates an image having undergone correction, by the controller, of the influence due to the X-ray sensor's characteristics for aforementioned digital data, such as dark correction, gain correction or defect correction. The X-ray image is also referred to as an X-ray projection image or a projection image in the following description.

With this arrangement, the X-ray detector 106 detects the X-rays to acquire the X-ray image. The X-ray detector 106 is fixed to an imaging unit moving mechanism (not shown). The imaging unit moving mechanism includes a holding portion of the X-ray detector 106 and a motor which causes the X-detector 106 to move along the object 102 together with the holding portion.

The mechanism control unit 105 transmits a control signal to respective motors of the generation unit moving mechanism and the imaging unit moving mechanism, and controls the positions of the X-ray tube 101 and the X-ray detector 106.

The imaging control unit 104 has a communication circuit which transmits the control signal for electrically controlling the driving circuit, the amplifier, the A/D converter, and the like of the X-ray detector 106, and receives the X-ray image from the X-ray detector 106. When the communication circuit of the X-ray detector 106 receives this control signal, its controller controls the operation timing of respective units to acquire an X-ray image. An X-ray generation device 107 includes a voltage generator which generates a predetermined voltage to be supplied to the X-ray tube 101, and a controller which controls the operation timing and/or the magnitude of the voltage to be supplied, and causes the X-ray tube 101 to generate X-rays in a predetermined condition. The X-ray imaging system control unit 108 integrally controls the mechanism control unit 105, the imaging control unit 104, and the X-ray generation device 107. The mechanism control unit 105 moves the X-ray detector 106 to the direction of an arrow 152 while moving the X-ray tube 101 to the direction of another arrow 151. During this movement, the X-rays are generated from a plurality of positions of the X-ray tube 101 by the X-ray imaging system control unit 108. The X-ray detector 106 detects these X-rays to acquire a plurality of X-ray images. The X-ray images from a plurality of X-ray irradiation angles are acquired.

The X-ray imaging system control unit 108 includes the image processing unit 109 and an image saving unit 112, and integrates one or more computers. The computer, for example, includes a main controller unit which has at least one CPU, and a storage unit such as a ROM (Read Only Memory) or a RAM (Random Access Memory). The computer may also include a graphic controller unit such as a GPU (Graphics Processing Unit), a communication unit such as a network card, and an input/output unit such as a keyboard, a display, a touch panel, or the like. Note that these respective units are connected via a bus or the like and controlled by the main controller unit executing a program stored in the storage unit. Furthermore, the X-ray imaging system control unit 108 includes the monitor 110 which displays the captured projection image and the operation unit 111 which is operated a by user. In the embodiment shown in FIG. 1, the X-ray imaging system control unit 108 and the image processing unit 109 are physically separate units. However, the present invention is not limited to this. For example, a GPU board may be installed in a computer which forms the X-ray imaging system control unit 108, and the GPU board and the CPU or the like of the X-ray imaging system control unit 108 may form the image processing unit 109.

The X-ray imaging system control unit 108 acquires a plurality of X-ray images (referred to as projection images) from various X-ray irradiation angles through the imaging control unit 104 from the X-ray detector 106, and provides these images to the image processing unit 109. The defect correction, the gain correction, a logarithmic transformation or the like is applied to the projection images in advance. Furthermore, geometrical information including positional information of the X-ray tube 101 and the X-ray detector 106 are transmitted and input to the image processing unit 109 for each X-ray image by the mechanism control unit 105. The image processing unit 109 reconstructs the acquired projection images to generate a tomographic image based on the geometrical information under the instruction of the X-ray imaging system control unit 108. The image processing unit 109 includes a difference processing unit 113, a back projection unit 114, an addition processing unit 115, a forward projection unit 116, an influence function calculation unit 117, and a noise amount estimating unit 118, and performs reconstruction processing by these respective units. Each unit of the image processing unit 109 may be implemented by a GPU, software for implementing each function, and a CPU which executes each instruction included in the software, respectively. Alternatively, each unit may be mounted using hardware by FPGA. In the case of mounting using hardware, each unit is implemented by translating the aforementioned software into a language compatible with the configuration of FPGA.

Figure 2:
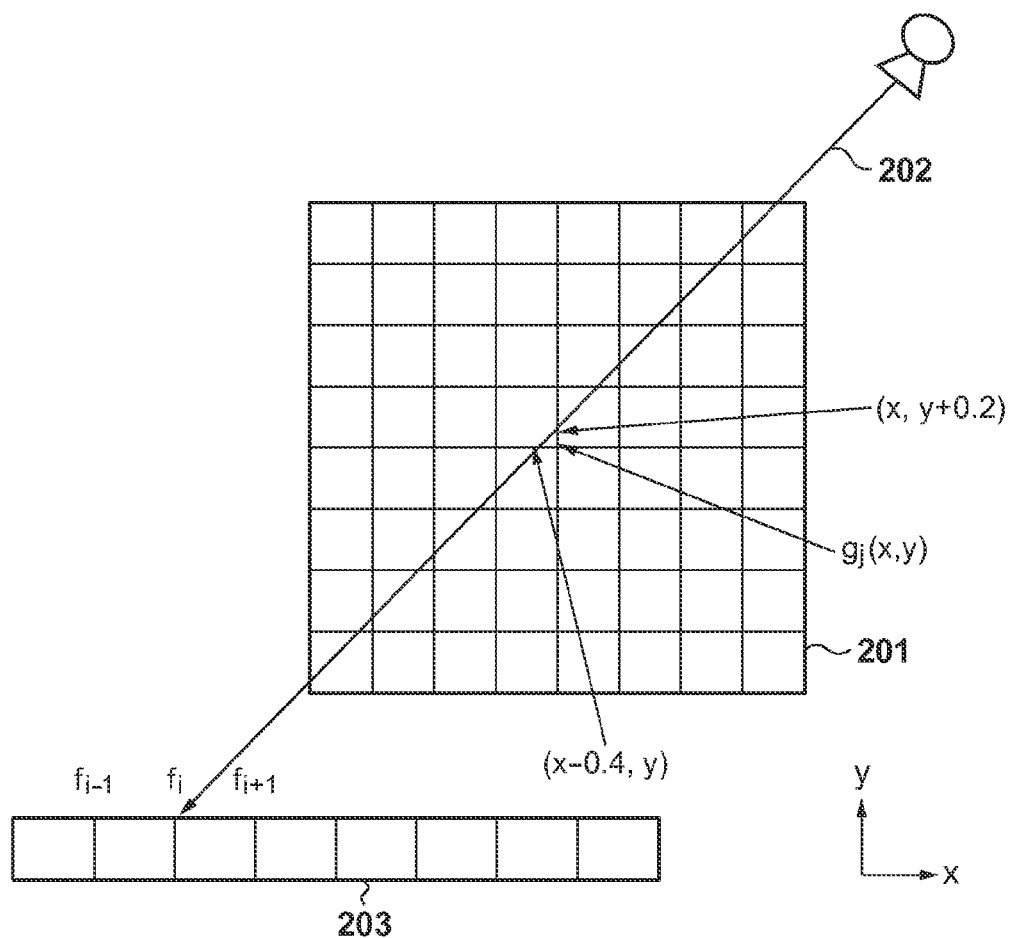
FIG. 2 is a view explaining the concept of forward projection according to the embodiment.

The difference processing unit 113 and generates and outputs an image which is acquired by calculating the difference between two input images. The addition processing unit 115, performs an addition operation for more than one input image, and outputs the added images. The forward projection unit 116 performs forward projection, which numerically simulates X-ray imaging, using inputs reconstructed data which is back projected by the back projection unit 114, a three-dimensional coordinate position of the reconstruction data in question, and position/orientation information regarding the direction and plane of projection, and outputs projection data. This practical method will be described with reference to FIG. 2. In FIG. 2, a grid point represents a pixel, and a grid spacing corresponds to a pixel pitch. Letting $f_i$ be a pixel of the X-ray detector 106 and $g_j$ be a pixel on a tomographic space 201 at a given X-ray irradiation angle, a contribution from the pixel $g_j$ on the tomographic space 201 to the pixel $f_i$ on a projection space 203 is C. At this time, the forward projection will be represented by:

$$f_i = \sum_{j=1}^{J} C_{ij} g_j \quad (1)$$

where i represents the i-th pixel of the projection space 203, and j represents the j-th pixel of the tomographic space 201. In addition, J is the total number of pixels in the tomographic space. $C_{ij}$ represents the contribution of $g_j$ to $f_i$. Therefore, if a line 202, which connects a focal point and $f_i$, passes through, for example, (x, y+0.2), (x−0.4, y) in the neighborhood of $g_j(x, y)$, $C_{ij}$=0.8×0.6=0.48 is obtained by linear interpolation. $C_{ij}$ may be obtained by calculating the contribution of $g_j$ to $f_i$. For example, $C_{ij}$ may be calculated using the length crossing the pixel, bicubic or higher-order interpolation, or the area of a shape on which one pixel is projected. For the convenience of description, equation (1) will hereinafter be rewritten as:

$$f = Hg \quad (2)$$

where f is a projection space vector including I elements and its component is $f_i$, H is a projection matrix of I rows×J columns and its component is $C_{ij}$, and g is a slice space vector including J elements and its component is $g_j$.

Contrary to the forward projection unit 116, the back projection unit 114 performs back projection operation of rearranging the tomographic image on the line which connects the projection image to the focal point and the X-ray detector. This can be represented by:

$$g_i = \sum_{i=1}^{I} C_{ij} f_i \quad (3)$$

where I is the total number of pixels in the projection space. As in equation (2), equation (3) can be rewritten as a vector given by:

$$g = H^T f \quad (4)$$

Thus, an inverse projection matrix $H^T$ is a transposed matrix of a projection matrix H.

From the pixel value of the projection image, the noise amount estimation unit 118 estimates and outputs a standard deviation, which is a statistical amount showing the noise amount. A practical estimation method will be described later. The influence function calculation unit 117 calculates an influence function for determining the degree of regulation in accordance with the pixel value and the noise amount of the tomographic image. A practical calculation method will be described later.

An example of the flow of the iterative reconstruction in the X-ray imaging apparatus 100 shown in FIG. 1 will now be described using FIG. 3.

First, in step S301, the X-ray imaging system control unit 108 acquires the projection image. This is executed by imaging the object 102 by the X-ray while changing the X-ray irradiation angle of the X-ray tube 101. The angle and the number of imaging operations depend on the performance and the specification of the imaging apparatus. For example, when 80 projection images are imaged by 15 FPS while changing the angle from −40 degree to +40 degree by 1 degree each time, they are acquired in about 6 seconds. Although the imaging condition of the X-ray can also be an arbitrary value, chest imaging, for example, may be performed at about 100 kV, 1 mAs. Furthermore, the distance between the X-ray detector 106 and the X-ray tube 101 is approximately set to the range from 100 cm to 150 cm, which is the setting range of a fluorography apparatus or a general imaging apparatus.

The X-ray detector 106 translates in a direction opposite to the rotation direction of the X-ray tube 101. At this time, if the X-ray irradiation angle rotates from β to 0 degree, it is given by Ptanβ assuming that P is the distance between the rotation center of the X-ray tube 101 and the X-ray detector 106. By translating the X-ray detector 106 in this way, the reference axis of the X-ray tube 101 always passes through the center of the X-ray detector 106 even when an X-ray irradiation direction of the X-ray tube changes.

A series of projection images acquired is input to the image processing unit 109 after having been preprocessed by the X-ray imaging system control unit 108. Note that the preprocessing includes correction of a defect pixel and a dark current of the X-ray detector 106, correction of an irradiation error attributed to the X-ray tube 101, and the logarithmic transformation. These processes can use processing which is generally executed in the X-ray detector. With the logarithmic transformation, the pixel value of the projection image is obtained as the line integral of an X-ray attenuation coefficient. The projection image is reconstructed based on the additivity of this X-ray attenuation coefficient.

In step S302, using the difference processing unit 113, the image processing unit 109 obtains the difference between the projection image f acquired in step S301 and the tomographic image $Hg^k$ (k represents the k-th iteration) forward projected in step S306. Note that when k=0, an initial value $g^0$ may be a nonnegative arbitrary value or a value obtained by back projecting a shot image f.

In step S303, the image processing unit 109 back projects the difference obtained in step S302 using the back projection unit 114. In step S304, the image processing unit 109 adds the result obtained by the back projection in step S303 to a tomographic image $g^k$ using the addition processing unit 115. As a result of the operation done so far, a tomographic image $g^{k+1}$ to be updated is represented by:

$$g^{k+1} = g^k + 2H^T(f - Hg^k) \quad (5)$$

In step S305, the image processing unit 109 checks whether the absolute value of $g^{k+1} - g^k$ is smaller than a predetermined value, whether k is larger than the predetermined value, and determines the end of iteration. If the end of iteration is determined, this process ends. Otherwise, the process proceeds to step S306. In step S306, the forward projection unit 116 forward projects a tomographic image ($g^{k+1}$) acquired in step S304 and provides the result for the difference calculation in the step S302. In the processing of steps S301 to S306 described above, the tomographic image is reconstructed using the iterative reconstruction method while repeating back projection and forward projection.

Note that the iterative reconstruction method represented by equation (5) is the simplest iterative reconstruction approach of the least square method which is generally referred to as SIRT. Note that the iterative reconstruction approach in the present invention is not limited to SIRT, but may use Bayes estimation type ML-EM or OS-EM obtained by enhancing its speed. In addition, there are also a steepest descent method, a conjugate gradient method and the like which speed up while optimizing an acceleration coefficient in SIRT. The embodiment of the present invention may use any of these. Furthermore, there are various other methods as the method of the iterative reconstruction. The embodiment of the present invention includes any approach as long as regulation can be done.

With a sufficient number of projection images and imaging at a high dose, it is possible to reconstruct a tomographic image which allows diagnosis from equation (5). However, in the medical field, it is highly desired to lower the dose of X-ray or decrease the number of projection images to decrease the exposure dose. When imaging a smaller number of projection images with a low dose, the artifacts and the noise are also reconstructed faithfully by repeating the iteration according to equation (5). As a result, diagnosis performance of the tomographic image suffers.

Hence, regulation is incorporated in equation (5) for reconstruction while suppressing the artifacts and the noise. In this regulation, noise reduction processing is executed. The processing of performing iterative reconstruction, which considers the noise amount and the contrast of the tomographic image according to this embodiment, will be described hereinafter by using FIG. 3. That is, in the noise reduction processing according to this embodiment, regulation is executed depending on the noise amount of each projection image in the iteration processing of back projection and forward projection in the aforementioned reconstruction processing.

In step S307, the image processing unit 109 estimates the noise amount, which corresponds to the projection image f acquired in step S301, using the noise amount estimation unit 118. The estimation of the noise amount may calculate the standard deviation using a peripheral pixel in each pixel of the projection image. However, this method is subject to the influence of the object and cannot calculate a precise noise amount. Although there is also a method of removing the influence of the object by a filter or the like, it is desirable to measure a noise characteristic of the X-ray detector 106 in advance to estimate the noise amount more precisely. Generally, as seen by equation (6) below, the noise amount of the X-ray detector 106 can be represented by electrical system noise and quantization noise, and can be determined uniquely by the pixel value of the X-ray detector 106. The equation (6) is:

$$\sigma(f) = \sqrt{\sigma_S^2 + \sigma_Q^2 (f/S)^{1/\gamma}} \quad (6)$$

where $\sigma_S$ is the standard deviation of the system noise of the X-ray detector 106, $\sigma_Q$ is the standard deviation of the quantization noise, (f/S) is a coefficient regarding the standard deviation of the quantization noise, $\gamma$ is a gamma value showing linearity, and S is the sensitivity of the X-ray detector 106. By storing, on a memory, the coefficient f/S obtained by fitting the estimated noise characteristic to the equation (6), it is possible to obtain the noise amount of each pixel from the pixel value of the projection image. In another embodiment, the memory may store a lookup table which indicates relationship between a pixel value and noise value included in the pixel value. The lookup table is also generated by the estimated noise characteristic of the X-ray detector 106.

In step S308, the image processing unit 109 back projects the square value of the noise amount (standard deviation) estimated in step S307 using the back projection unit 114 for estimating the noise amount of the tomographic image. Since the square value of the standard deviation is a variance and a statistical amount with additivity, the square root of the back projected variance corresponds to the standard deviation of the noise amount at each position of the tomographic image.

Note that in the following description, although the standard deviation of the noise calculated by back projection is used intact, a more precise noise amount may be calculated by iterative reconstruction of the variance of the noise based on equation (5). However, it has been empirically found that the standard deviation of the noise calculated by performing back projection is sufficiently proportional to the standard deviation of the noise of the tomographic image. Therefore, the standard deviation of the noise calculated by back projection can ideally represent the noise amount of the tomographic image by multiplying an appropriate coefficient without performing iterative reconstruction.

In step S309, the influence function calculation unit 117 calculates the influence function to execute regulation. The influence function is a derived function of a function used for regulation. The influence function used depends on the contrast described in literature 1 and literature 2, that is, the pixel value difference of the tomographic image. For example, the influence function of regulation based on the Huber function is given by:

$$R(\lambda, \varepsilon) = \begin{cases} \lambda & \text{if } |\lambda| \le \varepsilon \\ \text{sgn}(\lambda)\varepsilon & \text{otherwise} \end{cases} \quad (7)$$

Figure 4:
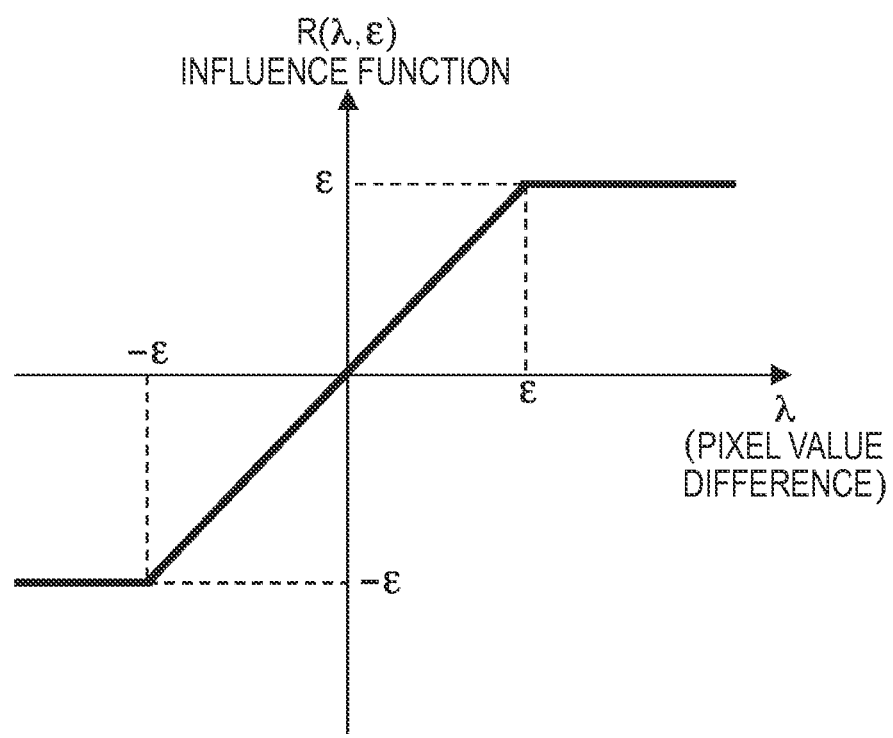
FIG. 4 is a view showing an example of the shape of an influence function according to the embodiment.

FIG. 4 shows the shape of the above function. This influence function returns the pixel value difference $\lambda$ of a slice intact when the absolute value of $\lambda$ is equal to or smaller than $\varepsilon$, returns $\varepsilon$ when the pixel value difference is larger than $\varepsilon$, and returns $-\varepsilon$ when the pixel value difference is smaller than $-\varepsilon$. That is, the influence function actively executes regulation in an area of high contrast while suppressing regulation in an area of low contrast.

Reregulation is executed by adding equation (8) below to equation (5) above because it is executed by using a target tomographic pixel $g_j$ and its peripheral pixel $g_m$:

$$-\sum_m \alpha_{jm} R(g_j - g_m, \varepsilon) \qquad (8)$$

where m represents the peripheral pixel of a pixel for which regulation is to be executed, and $\alpha_{jm}$ is a coefficient which adjusts the degree of regulation and the influence of the peripheral pixel.

Furthermore, in this embodiment, ε is changed in equation (8) depending on the standard deviation of noise of the tomographic image estimated in the steps S307 and S308. In this case, equation (8) is rewritten as:

$$-\sum_m \alpha_{jm} R\left(g_j - g_m, \beta\sqrt{(H^T \sigma^2)_j}\right) \qquad (9)$$

where β is a coefficient for determining the degree of suppression for the noise of the tomographic image.

In the addition processing in step S304 described above, the image processing unit 109 adds the result calculated in step S309 (equation (9)) to equation (5) using the addition processing unit 115. As a result, regulation iterative reconstruction can be represented by:

$$g_j^{k+1} = g_j^k + (2H^T(f - Hg^k))_j - \sum_m \alpha_{jm} R\left(g_j - g_m, \beta\sqrt{(H^T \sigma^2)_j}\right) \qquad (10)$$

Regulation iterative reconstruction based on equation (10) considers not only the contrast but also the noise amount of the tomographic image. That is, regulation iterative reconstruction appropriately estimates the noise amount in the tomographic image and adjusts the degree of regulation based on the estimated noise amount when reconstructing the tomographic image. Consequently, the noise is suppressed more adaptively, and the tomographic image can be reconstructed with its object structure being conserved. Hence, optimal reconstruction can be performed in accordance with the ratio of contrast to noise. This provides a tomographic image with high diagnosability, which suppresses noise while conserving the object structure more adaptively in consideration of the noise amount of the tomographic image which changes depending on the imaging condition and the object's body thickness.

Furthermore, $\alpha_{jm}$ in equation (10) above may be an amount which depends on the noise of the tomographic image as given by:

$$\alpha_{jm} = \omega_{jm}\sqrt{(H^T \sigma^2)_j} \qquad (11)$$

In this case, regulation can be strengthened where the noise amount is large and weakened where the noise amount is small, so the noise suppression effect can be obtained more effectively.

A plurality of tomographic images is acquired by executing steps S302 to S306 described above on a plurality of projection images acquired in step S301 respectively. The X-ray imaging system control unit 108 causes the monitor 110 to display the thus acquired plural tomographic images. As a result, diagnosis based on the tomographic image obtained by tomosynthesis becomes possible. The tomographic image is transmitted to and stored in, for example, PACS (Picture Archiving and Communication Systems, image management server). The tomographic image stored in PACS is displayed on a PACS viewer and used for image diagnosis by a diagnostician. The transmission of the tomographic image to PACS is executed by, for example, a communication circuit (not shown) included in the X-ray imaging system control unit 108. The communication circuit is communicatively connected with PACS via an in-hospital network and the tomographic image is transmitted to PACS via the network.

Second Embodiment

Figure 5:
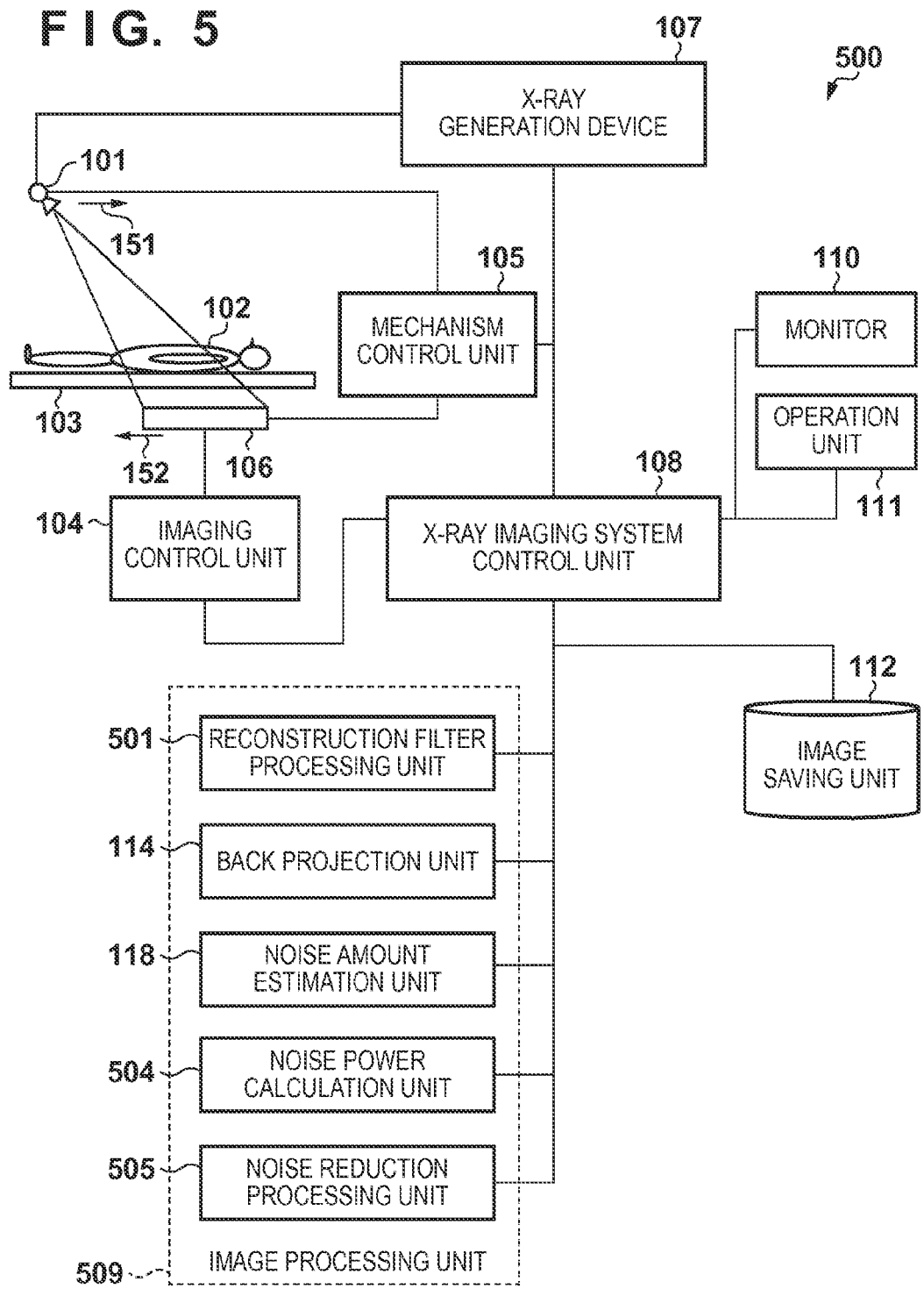
FIG. 5 is a block diagram showing an example of the functional arrangement of an X-ray imaging apparatus according to another embodiment.

An example of iterative reconstruction has been shown in the first embodiment. However, the embodiment of the present invention also includes noise reduction in analytical reconstruction; that is, reconstruction of a tomographic image by filtered back projection. In the following description, an arrangement in the embodiments of the present invention includes reconstruction of the tomographic image by filtered back projection will be described. FIG. 5 is a block diagram showing an example of the functional arrangement of an X-ray imaging apparatus 500 according to the second embodiment. Note that components similar to those in the first embodiment are given like reference numerals in FIG. 5.

An image processing unit 509 includes a reconstruction filter processing unit 501, a back projection unit 114, a noise amount estimation unit 118, a noise power calculation unit 504, and a noise reduction processing unit 505. The reconstruction filter processing unit 501 executes reconstruction filter processing on a projection image. In general, a Shepp & Logan filter, a ramp filter or the like is known as a reconstruction filter. The noise power calculation unit 504 calculates as noise power the sum of squares of the product of a reconstruction filter coefficient and a standard deviation of noise of the projection image. The noise reduction processing unit 505 executes structure conservation type low-pass filter processing in accordance with the standard deviation of the contrast of tomographic image and the noise of tomographic image. Here, examples of the structure conservation type low-pass filter include an ε filter, an MTM filter, a bilateral filter or the like.

Figure 6:
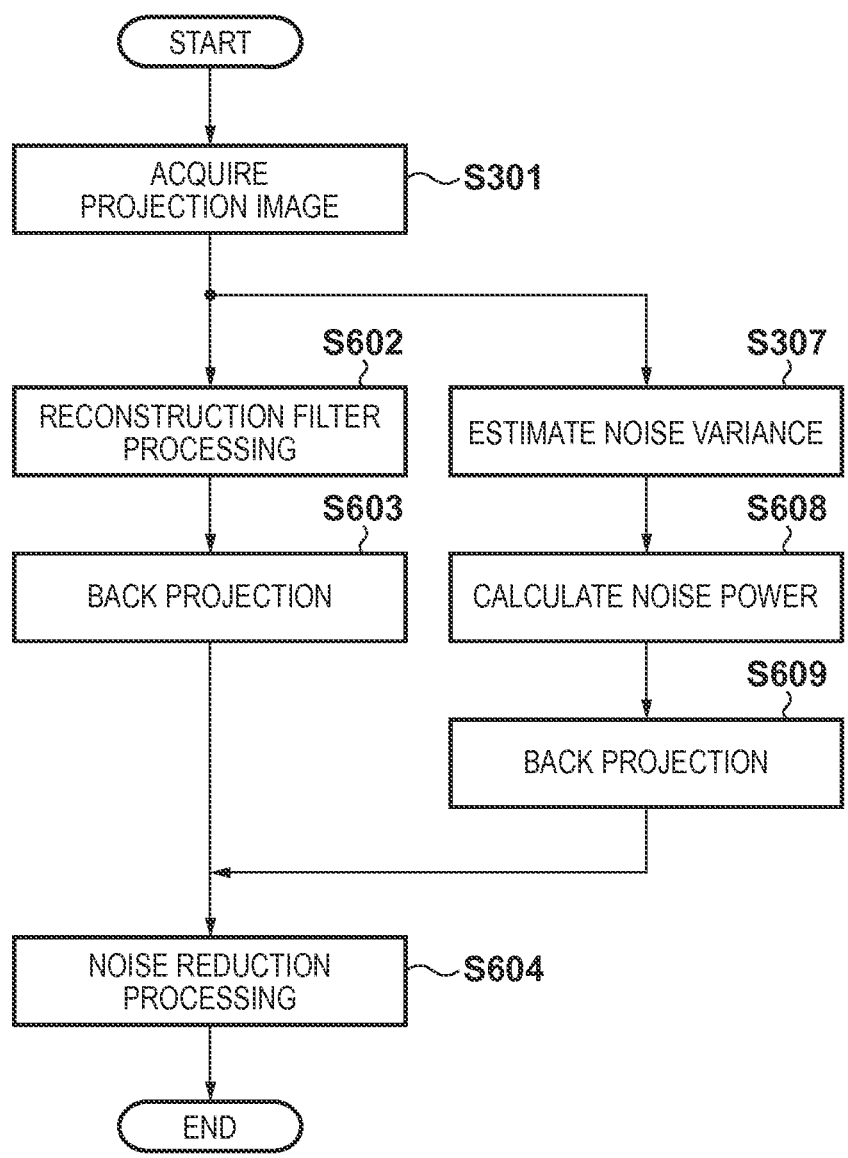
FIG. 6 is a flowchart showing the flow of image processing according to the other embodiment.

Reconstruction of the tomographic image in the X-ray imaging apparatus 500 shown in FIG. 5 and the flow of noise reduction processing will now be described using FIG. 6. Note that the processing of steps S301 and S307 is the same as that described in the first embodiment (FIG. 3).

In step S602, the image processing unit 509 executes reconstruction filter processing represented by equation (12) below using the reconstruction filter processing unit 501 on the projection image f acquired in step S301 and acquires a filtered projection image f':

$$f'_i = \sum_m R_{im} f_m \qquad (12)$$

where $R_{im}$ is a filter coefficient of the reconstruction filter, which is a ramp filter, a Shepp & Logan filter or the like as described above.

In step S603, the image processing unit 509 back projects the filtered projection image f' acquired in step S602 using the back projection unit 114. As a result, a tomographic image g is acquired as per:

$$g = H^T f' \qquad (13)$$

In step S307, the image processing unit 509 estimates the noise amount (standard deviation) of the projection image f acquired in step S301 using the noise amount estimation unit 118. The noise amount estimation by the noise amount estimation unit 118 is the same as that described in the first embodiment (refer to equation (6)). In step S608, the image processing unit 509 calculates the sum of squares of the product of the standard deviation of noise $\sigma_m$ of the projection image obtained in step S307 and the filter coefficient $R_{im}$ of the reconstruction filter using the noise power calculation unit 504. As a result, a noise power image P of the projection image which is represented by:

$$P_i = \sum_m R_{im}^2 \sigma_m^2 \quad (14)$$

is produced.

In step S609, the image processing unit 509 back projects the noise power image P using the back projection unit 114 to calculate the variance of the noise of the tomographic image. The square root of this variance corresponds to the standard deviation of the noise of the tomographic image.

In step S604, the image processing unit 509 executes, on the tomographic image g, adaptive noise reduction processing as represented by equation (15) below in accordance with the standard deviation of the noise of the tomographic image obtained in step S609. Note that an example of using an ε filter as a structure conservation type low-pass filter is assumed in the following equation (15):

$$g'_j = g_j - L_{nj} F(g_j - g_n, \beta \sqrt{(H^T P)_j}) \quad (15)$$

Note that in equation (15), $g'_j$ is the tomographic image having undergone the noise reduction processing, $g_j$ is the target tomographic pixel, and $g_n$ is its peripheral pixel.

Figure 7A:
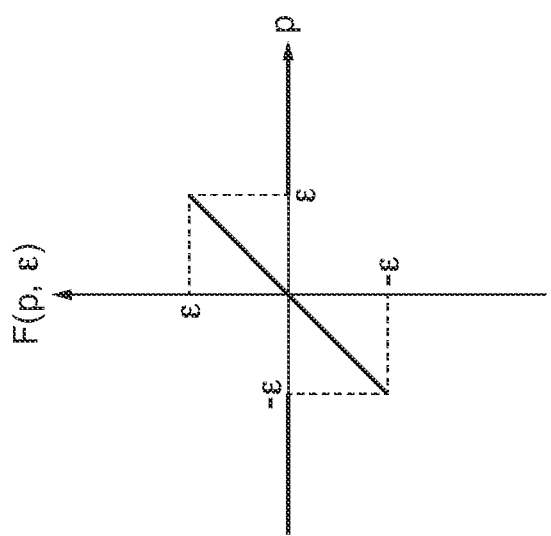
FIGS. 7A, 7B and 7C are views showing an example of the shape of a piecewise linear function according to the other embodiment.
Figure 7B:
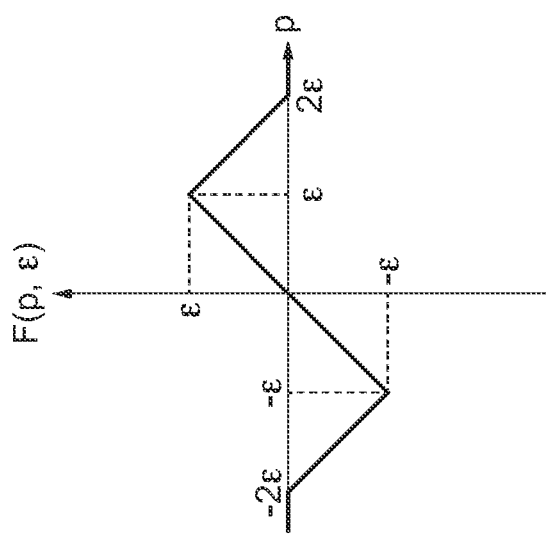
Figure 7C:
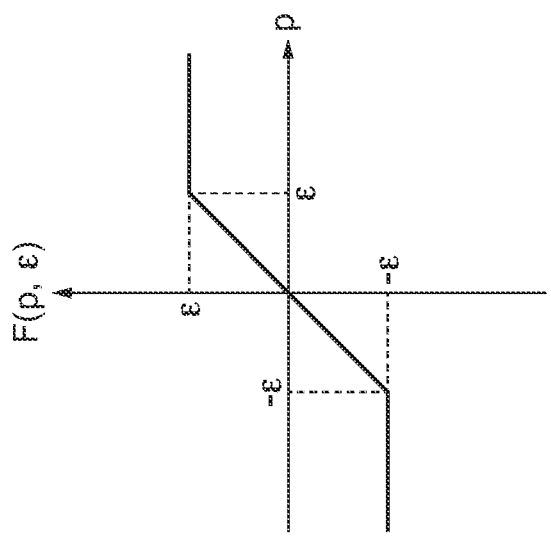

Here, $L_{nj}$ is a coefficient of the low-pass filter such as a Gaussian filter, F is a piecewise linear function, and the shapes such as in FIG. 7A, FIG. 7B, and FIG. 7C are plausible. In addition, β is a coefficient for determining the degree of suppression for the noise of the tomographic image.

The noise reduction processing based on equation (15) considers not only the contrast but also the noise amount of the tomographic image. That is, according to the second embodiment, noise can be reduced adaptively by calculating the noise amount of the tomographic image and executing the noise reduction processing using the calculated noise amount of the tomographic image when reconstructing the tomographic image from the projection image. Hence, according to the reconstruction of the tomographic image of the filtered back projection in the second embodiment, optimal noise reduction processing can be performed in accordance with the ratio of contrast to noise. This can provide a tomographic image with high diagnosability, which improves granularity and suppresses noise while maintaining the object structure more adaptively in consideration of the noise amount of the tomographic image which changes depending on the imaging condition and the object's body thickness.

Third Embodiment

In the first and the second embodiments, an example of processing which depends on the contrast has been described. However, the present embodiment of the present invention also includes reconstruction which depends only on the noise amount. In the following, the arrangement of the embodiment of the present invention of iterative reconstruction which depends only on the noise amount will be described. Note that components similar to those in the first embodiment are given like reference numerals in FIG. 8, and the description thereof will be omitted.

An example of the functional arrangement according to the third embodiment is shown in FIG. 8. In this embodiment, from the pixel value of a projection image, a noise amount estimation unit 818 estimates a standard deviation, which is a statistical amount showing the noise amount. Furthermore, an influence function calculation unit 817 calculates an influence function for determining the degree of regulation in accordance with the noise amount of the tomographic image.

Figure 9:
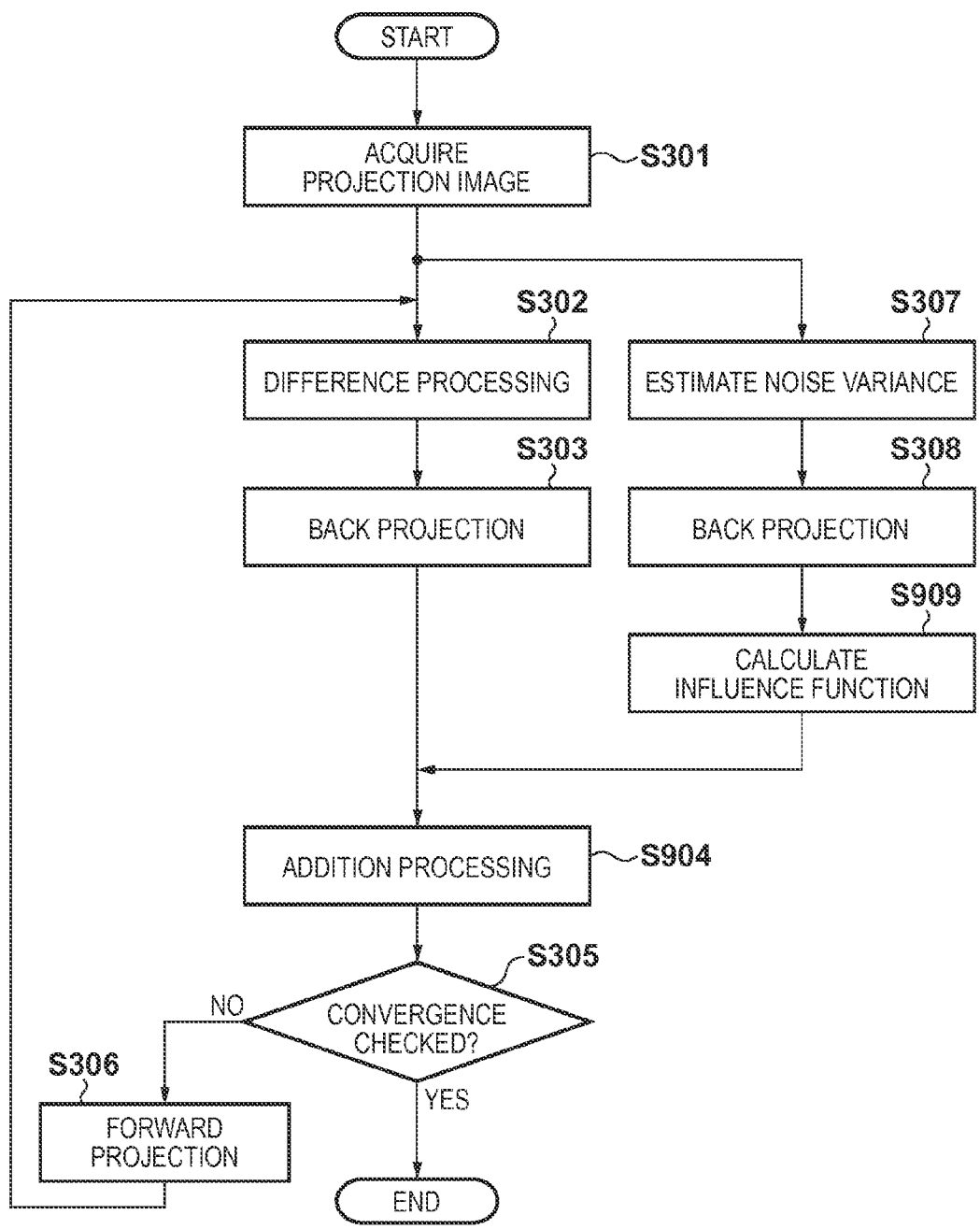
FIG. 9 is a flowchart showing the flow of image processing according to the third embodiment.

An example of the flow of processing according to the third embodiment is shown in FIG. 9. In step S909, the influence function is calculated using the influence function calculation unit 817 to execute regulation. The influence function is a derived function of a function used for regulation. The influence function used does not depend on the contrast of the tomographic image:

$$Q_j = \sqrt{(H^T(\sigma^2))_j} \quad (16)$$

Regulation is executed by adding equation (17) below to equation (5) above because it is executed by using a target tomographic pixel $g_j$ and its peripheral pixel $g_m$:

$$-Q_j \sum_m \kappa_{jm}(g_j - g_m) \quad (17)$$

where m represents the peripheral pixel of a pixel for which regulation is to be executed and $K_{jm}$ is a coefficient for adjusting the influence of the peripheral pixel.

In the addition processing in step S904, an image processing unit 809 adds the result calculated in step S909 (equation (17)) to equation (5) using an addition processing unit 815. As a result, regulation iterative reconstruction can be represented by:

$$g_j^{k+1} = g_j^k + (2H^T(f - Hg^k))_j - Q_j \sum_m \kappa_{jm}(g_j - g_m) \quad (18)$$

Regulation iterative reconstruction described by equation (18) is performed based on the noise amount of the tomographic image. That is, regulation iterative reconstruction appropriately estimates the noise amount in the tomographic image and adjusts the degree of regulation based on the estimated noise amount when reconstructing the tomographic image. Consequently, the noise is suppressed more adaptively, and a tomographic image with its object structure being conserved can be reconstructed. This can provide a tomographic image with high diagnosability, which suppresses noise while conserving the object structure more adaptively in consideration of the noise amount of the tomographic image, which changes depending on the imaging condition and the object's body thickness.

Figure 3:
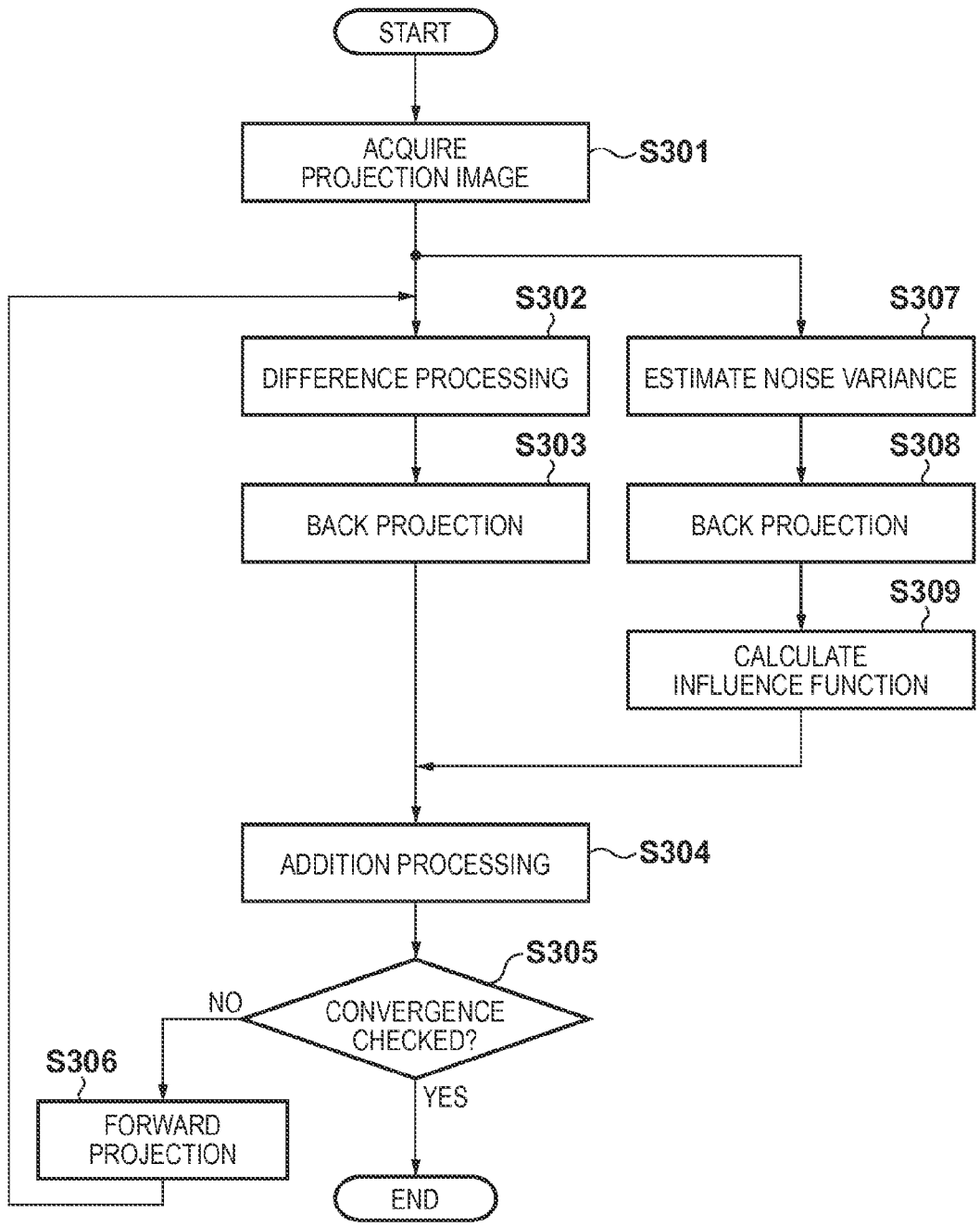
FIG. 3 is a flowchart showing the flow of image processing according to the embodiment.

Moreover, because a reconstruction image including appropriately suppressed noise with less calculation than was previously possible can be acquired by utilizing the aforementioned iterative reconstruction processing, a configuration in which, for example, a general-purpose GPU board is connected to a general-purpose computer as a X-ray imaging system control unit 108, and a program for executing processing shown in the flowchart in FIG. 3 is expanded in a RAM of the computer and executed by a CPU of the computer is included in the embodiments of the present invention, and iterative reconstruction processing can be achieved within a time which imposes no problem in practice. Hence, because iterative reconstruction processing can be practically utilized by an X-ray imaging apparatus 100 as an imaging modality, a tomographic image with high image quality can be acquired without using PACS, work station or the like. Therefore, when reimaging for example, the reconstruction processing can be completed while a post-imaging object 102 is placed on a bed 103 or the object 102 waits in an imaging room, and reimaging can be initiated continuously.

The examples of representative embodiments of the present invention have been described above. However, the present invention is not limited to the embodiments illustrated and described above, and changes and modifications can appropriately be made within the scope of the embodiment of the present invention. For example, the embodiment of the present invention can take the form of a system, an apparatus, a method, a program, a storage medium, or the like. More specifically, the embodiment of the present invention includes a system including a plurality of devices or an apparatus including a single device.

An embodiment of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-263674, filed Nov. 30, 2012, and No. 2013-216757, filed Oct. 17, 2013, which are hereby incorporated by reference herein in their entirety.

What is claimed is:

1. An image processing method for reconstructing a tomographic image from a plurality of projection images, the method comprising:
   receiving a plurality of projection data;
   acquiring noise data included in the plurality of received projection data;
   calculating noise variance of a projection image based on pixel values of the projection image;
   calculating noise variance of a tomographic image by applying back projection to the noise variance of the projection image or reconstructing the noise variance of the projection image; and
   changing, based on the noise variance of a tomographic image, a degree of regulation used for reconstructing the tomographic image, the regulation being processing that reduces noise of the tomographic image, wherein as the noise variance of a tomographic image is larger, the degree of regulation applied to reduce the noise becomes larger, and as the noise variance of a tomographic image is smaller, the degree of regulation applied to reduce the noise becomes smaller.

2. A non-transitory computer-readable storage medium storing a program which, when run on a computer, causes the computer to execute an image processing method for reconstructing a tomographic image from a plurality of projection images, the method comprising:
   receiving a plurality of projection data;
   acquiring noise data included in the plurality of received projection data;
   calculating noise variance of a projection image based on pixel values of the projection image;
   calculating noise variance of a tomographic image by applying back projection to the noise variance of the projection image or reconstructing the noise variance of the projection image; and
   changing, based on the noise variance of a tomographic image, a degree of regulation used for reconstructing the tomographic image, the regulation being processing that reduces noise of the tomographic image, wherein as the noise variance of a tomographic image is larger, the degree of regulation applied to reduce the noise becomes larger, and as the noise variance of a tomographic image is smaller, the degree of regulation applied to reduce the noise becomes smaller.

3. An image processing apparatus for reconstructing a tomographic image from a plurality of projection images, the apparatus comprising:
   a memory storing a program; and
   one or more processors which, by executing the program, function as:
   a first calculation unit configured to calculate noise variance of a projection image based on pixel values of the projection image;
   a second calculation unit configured to calculate noise variance of a tomographic image by applying back projection to the noise variance of the projection image or reconstructing the noise variance of the projection image; and
   a change unit configured to change, based on the noise variance of a tomographic image, a degree of regulation used for reconstructing the tomographic image, the regulation being processing that reduces noise, wherein as the noise variance of the tomographic image is larger the degree of regulation applied by the change unit to reduce the noise becomes larger and as the noise variance of the tomographic image is smaller the degree of regulation applied by the change unit to reduce the noise becomes smaller.

4. The apparatus according to claim 3, wherein the one or more processors, by executing the program, further function as a control unit configured to reconstruct the tomographic image, from which the noise reconstruction data is reduced, using an iterative reconstruction method.

5. The apparatus according to claim 3, wherein the second calculation unit is configured to reconstruct the tomographic image by filtered back projection using a reconstruction filter, and the first calculation unit processes the noise data of a projection image to obtain the noise reconstruction data using the reconstruction filter.

6. The apparatus according to claim 5, wherein the first calculation unit is configured to calculate noise power using a standard deviation of noise of the projection images and a filter coefficient of the reconstruction filter, and the second calculation unit is configured to calculate the noise reconstruction data by back projecting the noise power.

7. The apparatus according to claim 6, wherein the control unit is configured to obtain the tomographic image by calculating a tomographic image using an equation as follows:

$$g'_j = g_j - L_{nj} F(g_j - g_n, \beta \sqrt{(H^T P)_j})$$

wherein $g_{j'}$ is a j-th pixel of a tomographic image that has undergone the regulation, $g_j$ is a j-th pixel of the tomographic image generated by the filtered back projection, $g_n$ is a peripheral pixel of the j-th pixel of the tomographic image generated by the filtered back projection, $L_{nj}$ a low-pass filter coefficient, F is a piecewise linear function, $\beta$ is a coefficient for determining a degree of suppression for the noise reconstruction data, $H^T$ is an inverse projection matrix and P is the noise power obtained by the second calculation unit.

8. The apparatus according to claim 3, wherein the one or more processors, by executing the program, further function as an acquisition unit configured to acquire a noise amount of each pixel in accordance with a pixel value of the projection images to acquire the noise data of a projection image.

9. The apparatus according to claim 3, further comprising a transmission unit configured to transmit a control signal to an X-ray detector for acquiring the plurality of projection images.

10. The apparatus according to claim 3, wherein regulation is executed depending on the noise reconstruction data in iteration processing of back projection and forward projection in the reconstruction processing.

11. The apparatus according to claim 4, wherein the control unit is configured to determine a regulation term that relates to the degree of regulation, the regulation term being used for reconstructing the tomographic image by the iterative reconstruction method based on the noise reconstruction data.

12. The apparatus according to claim 11, wherein the control unit is configured to determine the regulation term so that a degree of regulation undergone by an area increases as the noise amount represented by the noise reconstruction data increases.

13. The apparatus according to claim 11, wherein the control unit is configured to determine the regulation term so that a degree of regulation undergone by an area increases as contrast in the tomographic image increases.

14. The apparatus according to claim 11, wherein the noise reconstruction data is obtained by iterative reconstruction of variance of the noise data of a projection image.

15. The apparatus according to claim 11, wherein the regulation is strengthened where a noise amount is large and weakened where the noise amount is small.

* * * * *